US011282165B2

United States Patent
Kansara

(10) Patent No.: US 11,282,165 B2
(45) Date of Patent: Mar. 22, 2022

(54) DYNAMICALLY CROPPING DIGITAL CONTENT FOR DISPLAY IN ANY ASPECT RATIO

(71) Applicant: NETFLIX, Inc., Los Gatos, CA (US)

(72) Inventor: Apurvakumar Dilipkumar Kansara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 15/203,608

(22) Filed: Jul. 6, 2016

(65) Prior Publication Data

US 2017/0249719 A1   Aug. 31, 2017

Related U.S. Application Data

(60) Provisional application No. 62/300,666, filed on Feb. 26, 2016.

(51) Int. Cl.
*G06K 9/00* (2006.01)
*G06T 3/40* (2006.01)
(Continued)

(52) U.S. Cl.
CPC ............ *G06T 3/40* (2013.01); *G06K 9/00228* (2013.01); *G06T 3/0012* (2013.01); *G06T 7/13* (2017.01);
(Continued)

(58) Field of Classification Search
CPC ....... G06T 2210/22; G06T 11/60; G06T 3/40; G06T 7/0042; G06T 7/60;
(Continued)

(56) References Cited

U.S. PATENT DOCUMENTS 8,041,076 B1 * 10/2011 Bourdev ............ H04N 5/23219
382/103
2005/0243351 A1 * 11/2005 Aoyama ............. H04N 1/4092
358/1.9
(Continued)

FOREIGN PATENT DOCUMENTS

EP   2916325 A1   9/2015
GB   2370438 A    6/2002

OTHER PUBLICATIONS

International Search Report and Written Opinion of the International Searching Authority for Application No. PCT/US2017/019546 dated Apr. 18, 2017, 16 pages.
(Continued)

*Primary Examiner* — Jin Cheng Wang
(74) *Attorney, Agent, or Firm* — Artegis Law Group, LLP

(57) ABSTRACT

One embodiment of the present invention sets forth a technique for dynamically cropping image data transmitted to an endpoint device. The technique includes computing a first visual interest score for a first visual interest region within a digital image based on content included in the first visual interest region, computing a second visual interest score for a second visual interest region within the digital image based on content included in the second visual interest region, and determining that the first visual interest region is preferred over the second visual interest region based on the first visual interest score and the second visual interest score. The technique further includes setting a location within the first visual interest region as a point of visual interest and transmitting the digital image and the location of the point of visual interest to a computing device for displaying a portion of the digital image that includes the point of visual interest.

21 Claims, 15 Drawing Sheets

(51) Int. Cl.
*G06T 7/00* (2017.01)
*H04N 7/01* (2006.01)
*H04N 21/4402* (2011.01)
*G06T 7/13* (2017.01)
*G06T 3/00* (2006.01)
*H04N 5/262* (2006.01)

(52) U.S. Cl.
CPC ... *H04N 7/0122* (2013.01); *H04N 21/440272* (2013.01); *H04N 5/2628* (2013.01)

(58) Field of Classification Search
CPC ....... G06K 2009/4666; G06K 9/00979; G06K 9/3233; G06K 9/4671; G06K 9/52; G06K 9/6215; G06F 17/30256
USPC ......................................................... 382/195
See application file for complete search history.

(56) References Cited

U.S. PATENT DOCUMENTS

| | | | | |
|---|---|---|---|---|
| 2006/0177132 | A1* | 8/2006 | Jackson | H04N 1/3873 382/173 |
| 2008/0181512 | A1* | 7/2008 | Gavin | G06T 11/60 382/209 |
| 2009/0300553 | A1* | 12/2009 | Pettigrew | G06T 11/20 715/856 |
| 2011/0096228 | A1* | 4/2011 | Deigmoeller | G06K 9/00624 348/441 |
| 2012/0093418 | A1 | 4/2012 | Kim et al. | |
| 2013/0108157 | A1* | 5/2013 | Ptucha | H04N 1/3873 382/173 |
| 2013/0108167 | A1* | 5/2013 | Ptucha | G06T 11/00 382/195 |
| 2013/0142450 | A1* | 6/2013 | Doyle | H04N 1/40062 382/275 |
| 2014/0111542 | A1* | 4/2014 | Wan | G06F 3/147 345/633 |
| 2014/0266803 | A1* | 9/2014 | Bulan | G06K 9/00785 340/932.2 |
| 2015/0117705 | A1* | 4/2015 | Zhang | G06K 9/00812 382/103 |
| 2015/0161466 | A1* | 6/2015 | Welinder | G06K 9/00979 382/195 |
| 2015/0169989 | A1* | 6/2015 | Bertelli | G06K 9/6202 382/165 |
| 2015/0359502 | A1* | 12/2015 | Zou | A61B 6/5217 378/62 |
| 2016/0048952 | A1* | 2/2016 | Tezaur | G06T 5/004 382/255 |
| 2016/0063734 | A1* | 3/2016 | Divakaran | G06K 9/6202 382/110 |
| 2016/0104054 | A1* | 4/2016 | Lin | G06K 9/4671 382/192 |
| 2016/0104055 | A1* | 4/2016 | Lin | G06T 3/0012 382/298 |
| 2016/0110625 | A1* | 4/2016 | Vaughan | G06T 7/11 382/103 |
| 2016/0117798 | A1* | 4/2016 | Lin | G06T 3/40 345/667 |
| 2016/0269645 | A1* | 9/2016 | Khoe | H04N 5/23219 |
| 2017/0087023 | A1* | 3/2017 | Peli | A61H 3/061 |
| 2017/0091905 | A1* | 3/2017 | Basche | G06F 3/04842 |
| 2019/0073553 | A1* | 3/2019 | Yao | G06K 9/46 |

OTHER PUBLICATIONS

Fan et al., "Looking into Video Frames on Small Displays", Internet Citation, Nov. 2, 2003, XP007903055, http://portal.acm.org/citation.cfm?doid=957013.957063, 4 pages.

Chen et al., "A Visual Attention Model for Adapting Images on Small Displays", Multimedia Systems, ACM, New York, NY, US, vol. 9, No. 4, Oct. 1, 2003, XP001196335, pp. 353-364.

* cited by examiner

DYNAMICALLY CROPPING DIGITAL CONTENT FOR DISPLAY IN ANY ASPECT RATIO

CROSS-REFERENCE TO RELATED APPLICATIONS

This application claims benefit of U.S. Provisional Patent Application filed Feb. 26, 2016 and having Ser. No. 62/300,666. The subject matter of this related application is hereby incorporated herein by reference.

BACKGROUND OF THE INVENTION

Field of the Invention

The present invention relates generally to computer science and, more specifically, to an approach for dynamically cropping digital content for display in any aspect ratio.

Description of the Related Art

Visual content, such as images and videos, are typically formatted for display in a particular display aspect ratio. For example, motion pictures are generally formatted with a display aspect ratio of 16:9 (i.e., sixteen arbitrary units in length to nine arbitrary units in height) to better fit projection screens employed in movie theaters; whereas, analog television broadcasts were formatted with a display aspect ratio of 4:3, to fit the typical screen of a cathode-ray tube television set.

With the advent of the Internet and digital media, visual content is now commonly viewed on display devices having different display aspect ratios than the original format of the image or video. As a result, satisfactory presentation of the visual content can be problematic. Specifically, the image or video may be scaled down to fit entirely within the display device, or, alternatively, the original content may be cropped to fit the display aspect ratio of a particular display device. With either approach, the viewing experience is diminished, particularity for the smaller display screens associated with mobile devices.

For smaller display screens, such as the display screens of smartphones, electronic tablets, and smartwatches, scaling down images and video is generally an unworkable solution. Because the presentation size of the content is already relatively small, further reduction can render the images video unviewable. However, cropping is also an undesirable approach, since removal of edge portions of an image or video can often result in the most visually interesting or significant subject matter not being displayed. Therefore, when using smaller electronic devices, viewing images or videos having a display aspect ratio that does not conform to that of the display device generally leads to a compromised viewing experience.

As the foregoing illustrates, what would be useful is a more effective approach to displaying visual content having a different display aspect ratio than the device on which the visual content is being displayed.

SUMMARY OF THE INVENTION

One embodiment of the present invention sets forth a technique for dynamically cropping image data transmitted to an endpoint device. The technique includes computing a first visual interest score for a first visual interest region within a digital image based on content included in the first visual interest region, computing a second visual interest score for a second visual interest region within the digital image based on content included in the second visual interest region, and determining that the first visual interest region is preferred over the second visual interest region based on the first visual interest score and the second visual interest score. The technique further includes setting a location within the first visual interest region as a point of visual interest and transmitting the digital image and the location of the point of visual interest to a computing device for displaying a portion of the digital image that includes the point of visual interest.

At least one advantage of the disclosed techniques is that, even when the display aspect ratio of a digital visual content item varies significantly from the display aspect ratio of a display device, the most visually interesting or significant subject matter in the digital visual content item remains viewable.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
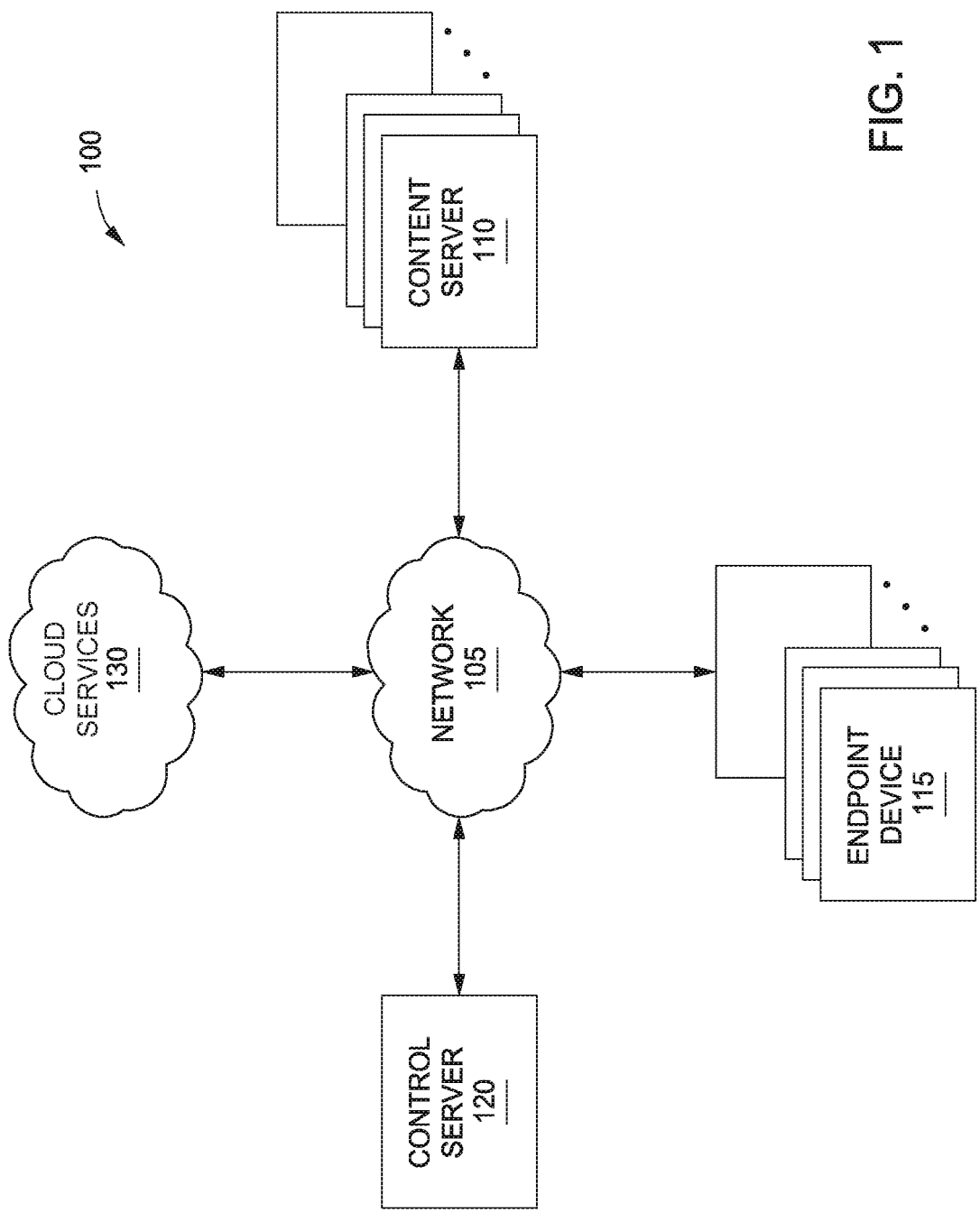
FIG. 1 illustrates a network infrastructure used to distribute content to content servers and endpoint devices, according to various embodiments of the present invention.

FIG. 1 illustrates a network infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
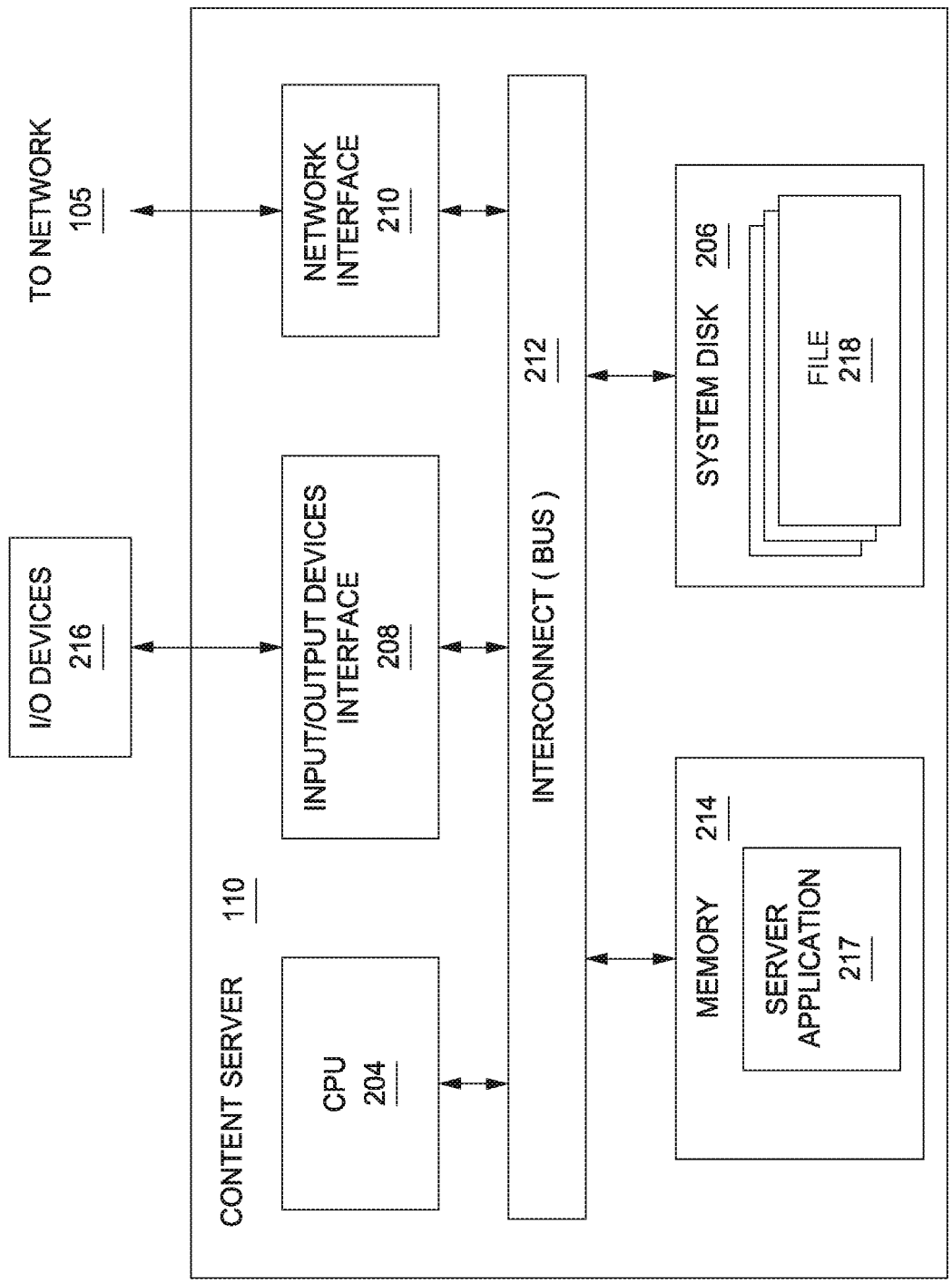
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include dynamic cropping metadata, described below, associated with one or more digital visual content items. The dynamic cropping metadata for a particular digital visual content item enables endpoint device 115 to dynamically crop the digital visual content item so that the most visually interesting or significant subject matter in the digital visual content is displayed. In alternative embodiments, dynamic cropping metadata associated with digital visual content items may instead be stored in a control server 120, or in any other technically feasible location.

Figure 3:
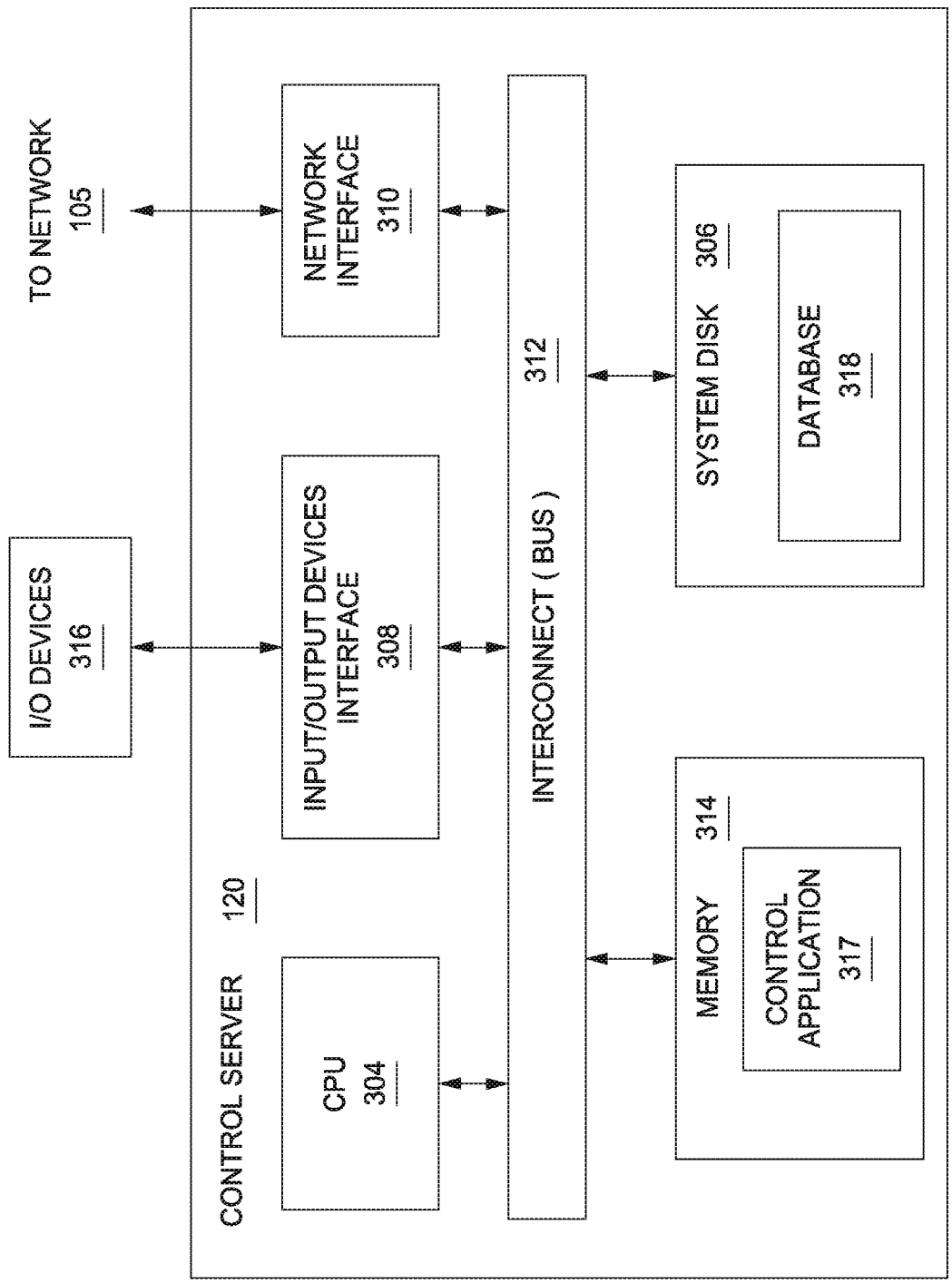
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115. As noted above, in some embodiments, dynamic cropping metadata associated with digital visual content items may be stored in database 318 rather than in files 218 stored in content servers 110.

Figure 4:
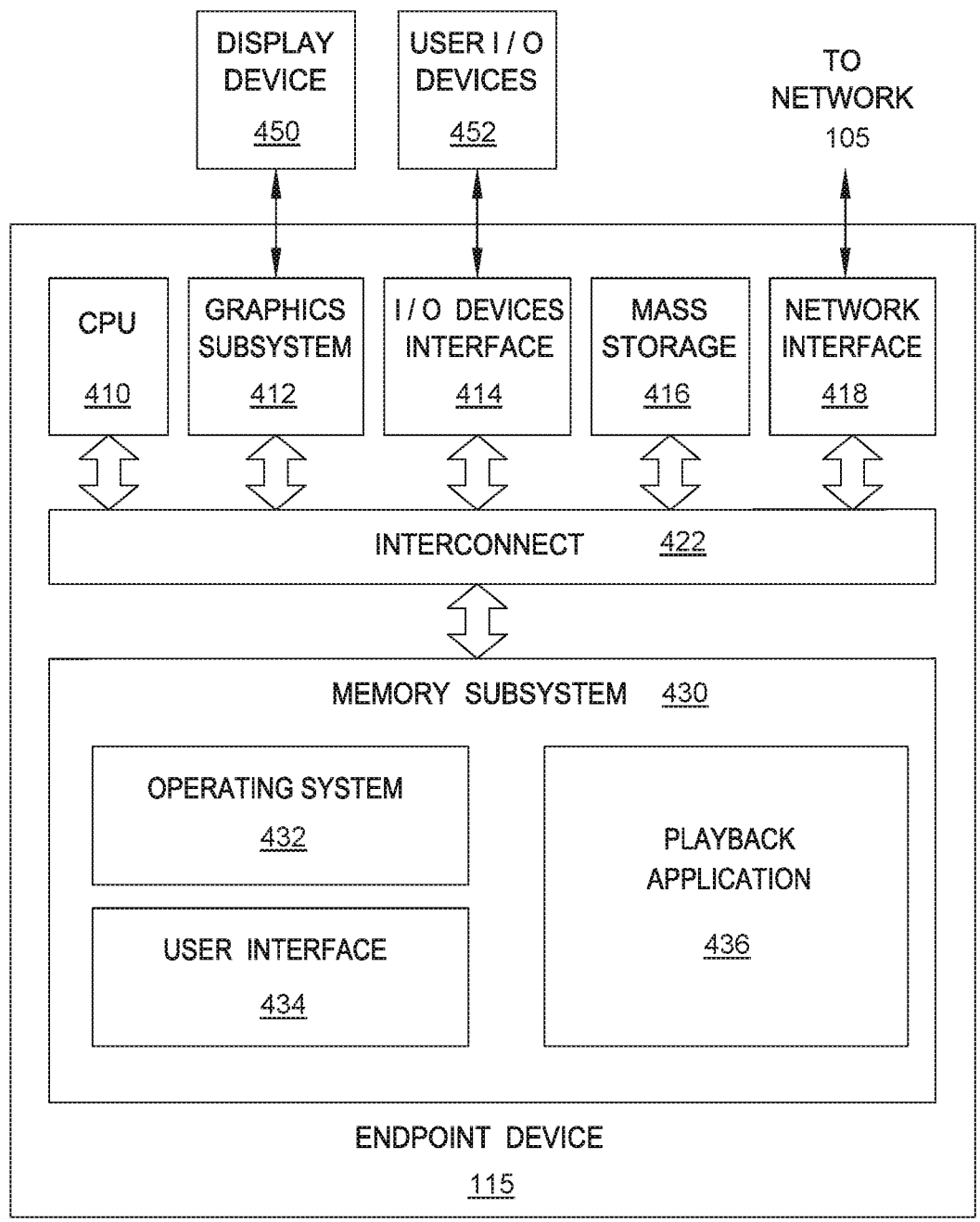
FIG. 4 is a block diagram of an endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452.

Determination of Dynamic Cropping Metadata

According to various embodiments of the present invention, a digital visual content item, such as a digital image or a digital video, is transmitted to an endpoint device, together with dynamic cropping metadata associated with the digital visual content item. The dynamic cropping metadata for a particular digital visual content item enables an endpoint device to dynamically crop that particular digital visual content item so that the most visually interesting or significant subject matter in the digital visual content item is displayed. Thus, even when the display aspect ratio of the digital visual content item varies significantly from the display aspect ratio of a display device, the most visually interesting or significant subject matter, hereinafter referred to as the point of visual interest, remains viewable. FIGS. 5A-5D contrast a digital visual content item that is displayed uncropped, cropped according to a conventional approach, and dynamically cropped based on subject matter.

Figure 5A:
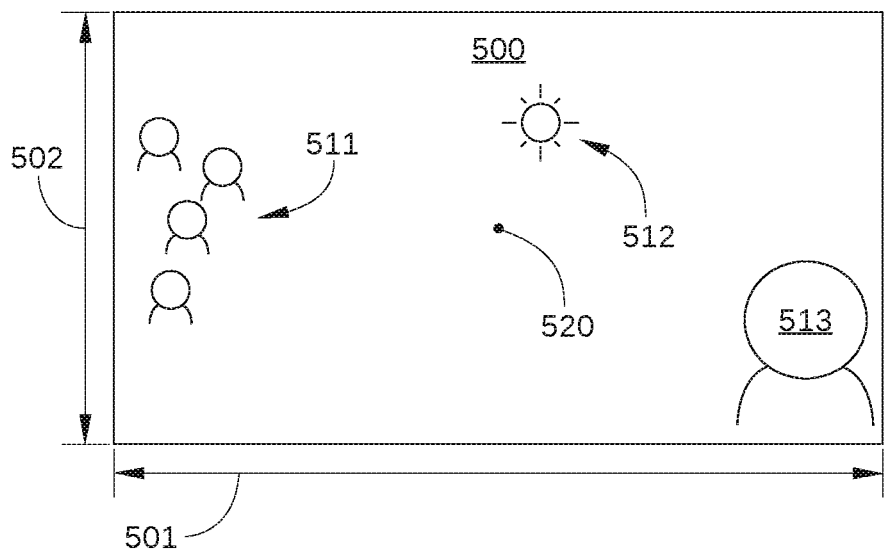
FIG. 5A illustrates a digital image when uncropped, according to various embodiments of the present invention.
Figure 5B:
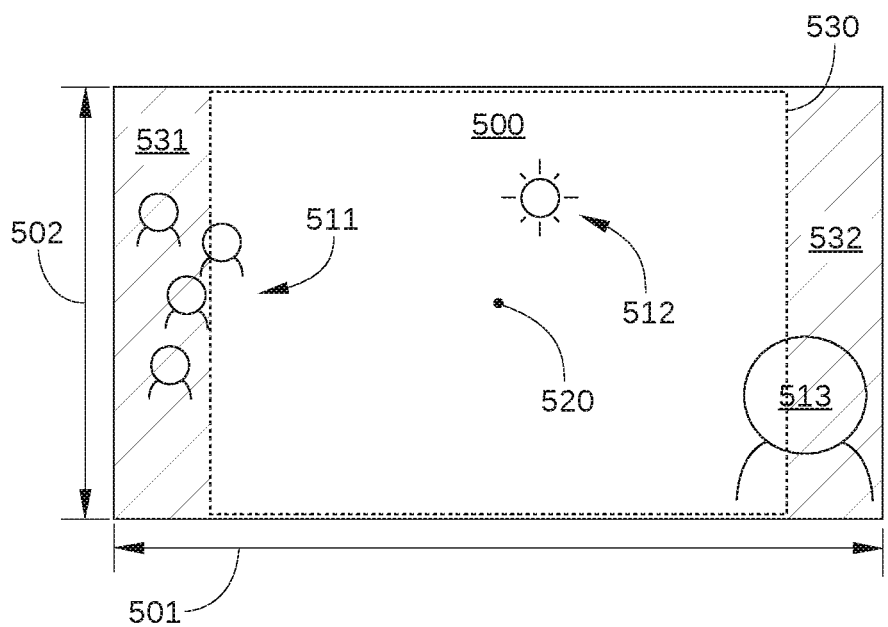
FIGS. 5B and 5C illustrate a digital image when a portion thereof is selected for display according to conventional techniques.
Figure 5C:
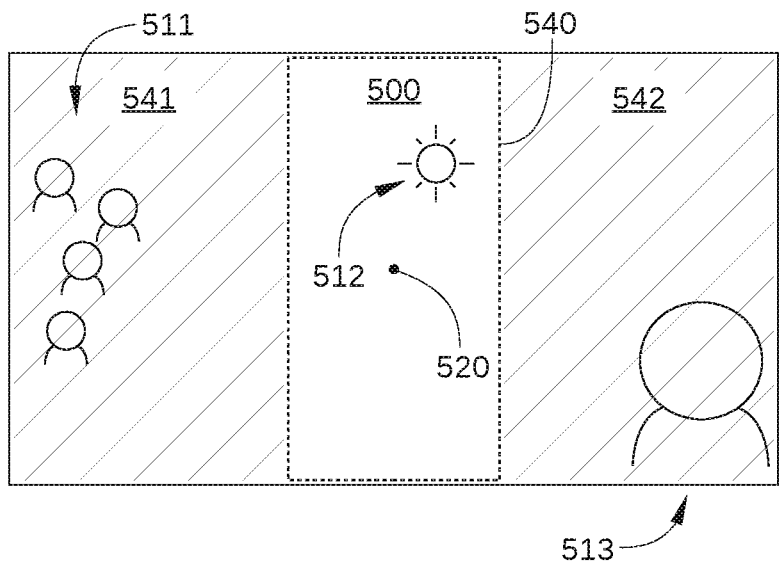
Figure 5D:
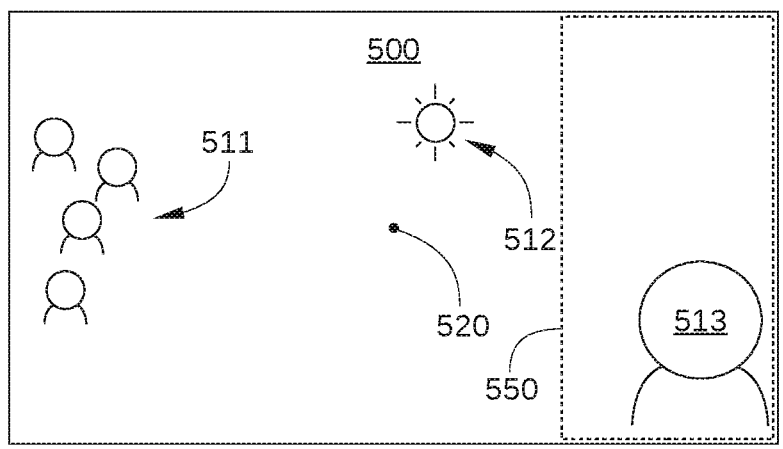
FIG. 5D illustrates a digital image when a portion thereof is selected for display, according to various embodiments of the present invention.

FIG. 5A illustrates a digital image 500 when uncropped, FIGS. 5B and 5C illustrate digital image 500 when a portion thereof is selected for display according to conventional techniques, and FIG. 5D illustrates digital image 500 when a portion thereof is selected for display according to various embodiments of the present invention. Digital image 500 is a numeric representation of a two-dimensional image, such as a single digital image or photograph, or a single frame of a digital video. Digital image 500 may be a rastor or bit-mapped image, and includes a plurality of pixels. Generally, digital image 500 has pixel dimensions that include a pixel width 501 that equals the horizontal dimension of digital image 500, expressed in pixels, and a pixel height 502 that equals the vertical dimension of digital image 500, expressed in pixels. In addition, digital image 500 has a display aspect ratio that describes the proportional relationship between pixel width 501 and pixel height 502. Thus, when formatted for display on a conventional movie theater screen or a wide-screen television, digital image 500 may have a display aspect ratio of 16:9. Alternatively, when originally formatted for display on an analog television screen, digital image 500 may have a display aspect ratio of 4:3. In another example, when originally generated by a digital camera, such as a digital single-lens reflex camera, digital image 500 may have a display aspect ratio of 3:2. Furthermore, digital image 500 may have any other technically feasible display aspect ratio.

In the embodiment illustrated in FIGS. 5A-5D, digital image 500 has an aspect ratio of 16:9, and includes a mixture of subject matter. For example, and without limitation, digital image 500 includes a group of individuals 511 disposed in a background portion of digital image 500, and non-human subject matter 512. In addition, digital image 500 includes a single individual 513 that is disposed in a foreground portion of digital image 500 and is a point of high visual interest of digital image 500.

As shown, individuals 511 are disposed left of a center point 520 of digital image 500, which is generally congruent with a centroid or geometric center of digital image 500. Thus, center point 520 is typically disposed midway between the top and bottom edges of digital image 500 and midway between the left and right edges of digital image 500. In addition, non-human subject matter 512 is disposed proximate center point 520, while single individual 513 is right of center point 520. Thus, the point of high or highest visual interest of digital image 500, i.e., single individual 513, may not be co-located with center point 520. Consequently, when digital image 500 is cropped for display by a display device having a different display aspect ratio than 16:9, single individual 513 may be partially or completely outside the viewable portion of digital image 500. One such situation is illustrated in FIG. 5B.

In FIG. 5B, a display canvas 530 is shown superimposed on digital image 500. Display canvas 530 indicates the portion of digital image 500 that is viewable when displayed by a particular display device that has a different display aspect ratio than that of digital image 500. For example, display canvas 530 may be associated with the display screen of a smartphone or electronic tablet, and therefore has the same display aspect ratio as the display screen for that particular device. For all or substantially all of the display device to be utilized for displaying image content, digital image 500 may be scaled so that, for example, pixel height 502 equals the vertical dimension of display canvas 530. As a result, a non-viewable portion or portions 531 and 532 (hash-marked) of digital image 500 are generally disposed outside the portion of digital image 500 displayed by the display device. That is, non-viewable portion 531 and non-viewable portion 532 are disposed outside display canvas 530 when digital image 500 is displayed.

As shown, display canvas 530 is generally centered on center point 520, so that non-viewable portion 531 and non-viewable portion 532 may be substantially equal in size. Furthermore, because display canvas 530 is centered on center point 520, the portion of digital image that falls within display canvas 530 is independent of subject matter included therein. That is, the portion of digital image 500 that falls within display canvas 530 is selected irrespective of subject matter included in digital image 500. Thus, in the embodiment illustrated in FIG. 5B, the subject matter of high or highest visual interest of digital image 500, i.e., single individual 513, is largely excluded from display canvas 530. Instead, subject matter of the least visual importance in digital image 500, i.e., non-human subject matter 512, figures most prominently in display canvas 530. Therefore, because non-viewable portion 531 and/or non-viewable portion 532 include visually significant subject matter, the viewing experience of digital image 500 (or a video of which digital image 500 is a part) is greatly diminished.

Figure 6:
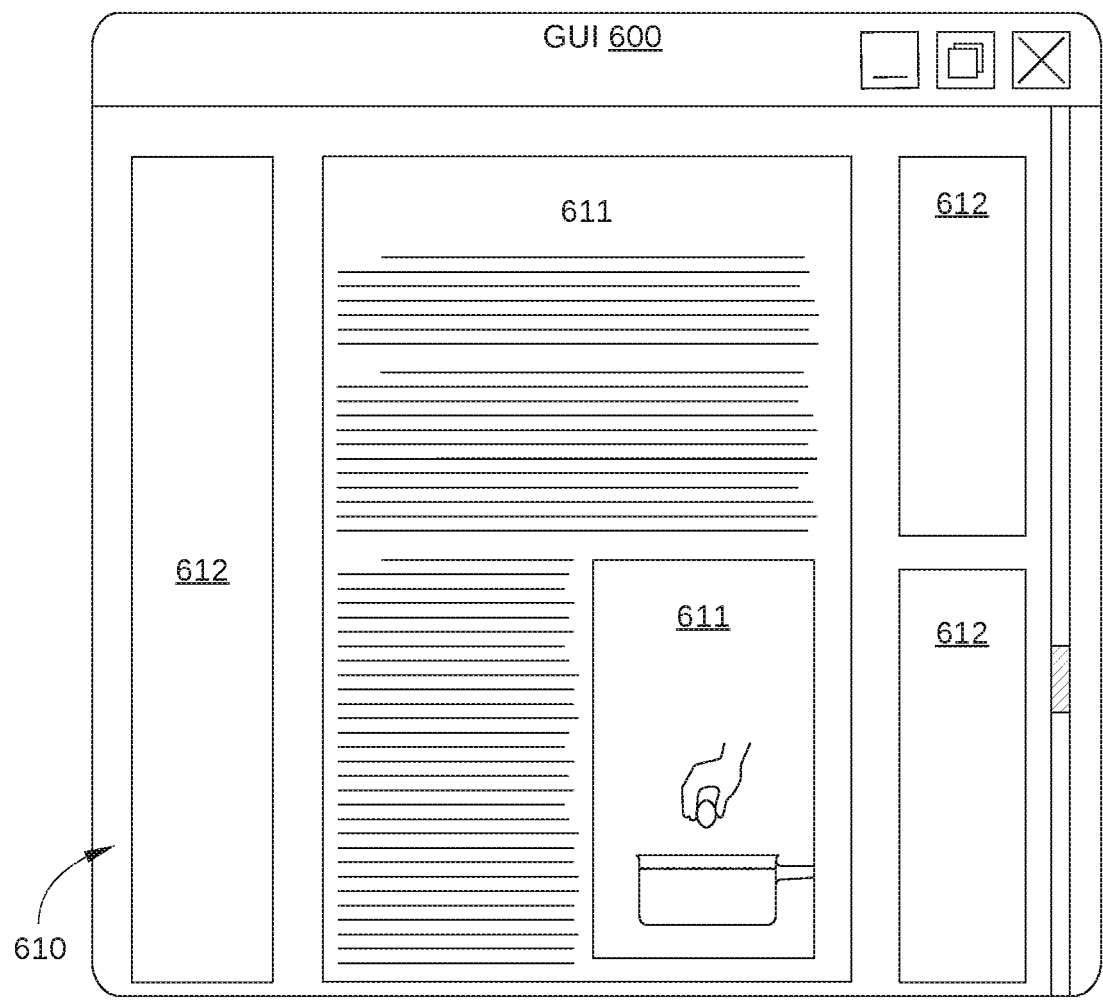
FIG. 6 illustrates a graphical user interface (GUI) of a web browser application displaying a web page, according to various embodiments of the present invention.

In some embodiments, display canvas 530 may be associated with a presentation window of a strip advertisement, or "strip ad," such as that configured to be featured in a peripheral portion of a web page. One such embodiment is illustrated in FIG. 6. FIG. 6 illustrates a graphical user interface (GUI) 600 of a web browser application displaying a web page 610, according to various embodiments of the present invention. Web page 610 typically includes web page content 611, such as text, hypertext, and images related to web page 610, and advertising content 612, such as static image strip ads, animated strip ads, pop-up strip ads, and the like.

As shown, to facilitate display in peripheral regions of GUI 600, the aspect ratio of a particular example of advertising content 612 can vary greatly from the 4:3 and 16:9 display aspect ratios of common video formats, or the 3:2 display aspect ratio of images captured by most digital cameras. For example, a presentation window for advertising content 612 displayed in a side region of GUI 600 may have a pixel width of 300 pixels and a pixel height of 600 pixels or more. That is, such a presentation window (and the associated display canvas) may have a display aspect ratio of 1:2 or less, which is very different from the 16:9 display aspect ratio of modern video formats. Consequently, when an uncropped digital image or video is employed as subject matter for display, such as a single frame or looped sequence taken from a video, the most visually interesting or significant subject matter will likely not be visible in the presentation window. One such example is illustrated in FIG. 5C.

In FIG. 5C, a display canvas 540 is shown superimposed on digital image 500 that is associated with a presentation window of a strip advertisement, such as advertising content 612 in FIG. 6. Display canvas 540 indicates the portion of digital image 500 that is viewable when digital image 500 is employed as digital visual content for a strip advertisement featured on a web page. As noted above, the display aspect ratio of a typical strip advertisement presentation window can be 1:2 or less, whereas the display aspect ratio of digital image 500 is 16:9. Consequently, the majority of digital image 500 falls within non-viewable portions 541 and 542 (hash-marked) of digital image 500. Furthermore, the most visually interesting and significant subject matter is not being displayed, since display canvas 540 is typically centered on center point 520 of digital image 500, and the position of display canvas 540 relative to digital image 500 is selected irrespective of subject matter within digital image 500.

According to one or more embodiments of the present invention, a digital image or video is dynamically cropped based on subject matter included therein and on the display aspect ratio of the display device. As a result, when the digital image is displayed on a display canvas having a different display aspect ratio than the digital image, the most visually interesting and significant subject matter is still being displayed, since the display canvas is centered on the most visually interesting subject matter rather than on a center point 520 of the digital image. One such embodiment is illustrated in FIG. 5D.

In FIG. 5D, a display canvas 550 is shown superimposed on digital image 500. Display canvas 550 indicates the portion of digital image 500 that is viewable when displayed by a particular display device that has a different display aspect ratio than that of digital image 500. Similar to display canvas 530 and display canvas 540, display canvas 550 may be associated with the display screen of a smartphone or electronic tablet, or a presentation window of a strip advertisement, and therefore has the same display aspect ratio as the particular display device or presentation window. In the embodiment illustrated in FIG. 5D, display canvas 550 has a display aspect ratio of a presentation window of a strip advertisement.

Unlike display canvas 530 in FIG. 5B or display canvas 540 in FIG. 5C, display canvas 550 is generally not centered on center point 520 of digital image 500. Instead, the portion of digital image 500 that is selected for display via display canvas 550 includes and/or is centered on a point of visual interest in digital image 500. In the embodiment illustrated in FIG. 5D, single individual 513, which is a human figure disposed in a foreground portion of digital image 500, is the subject matter of high or highest visual interest of digital image 500. As shown, the portion of digital image 500 that is selected for display via display canvas 550 includes single individual 513. Thus, when digital image 500 is displayed on display canvas 550, the subject matter of high or highest visual interest of digital image 500 remains visible, even though the display aspect ratio of display canvas 550 is very different than the display aspect ratio of digital image 500.

In one or more embodiments, the location within digital image 500 of a point of visual interest is included as metadata associated with digital image 500. In such embodiments, the location of the point of visual interest within digital image 500 is determined in an automated fashion based on subject matter in digital image 500. More specifically, multiple visual interest regions are selected within digital image 500, or within an edge diagram generated from digital image 500, to facilitate a quantitative comparison of how visually interesting different locations within digital image 500 are relative to each other. That is, for each such visual interest region, a visual interest score can be computed based on predetermined criteria, and the visual interest region with the highest visual interest score can then be selected as the portion of digital image 500 that includes the point of higher visual interest to a viewer.

The location of the point of higher visual interest is retained as metadata associated with digital image 500. Based on this metadata, digital image 500 can be dynamically cropped when displayed, so that the point of visual interest to a viewer is displayed by a display device, even when the point of visual interest is not located proximate center point 520 of digital image 500. Various embodiments of visual interest regions that may be employed to determine the location of a point of visual interest are described below in conjunction with FIGS. 7A-C. One embodiment of a computing device configured to determine the location of a point of visual interest in a digital image based on subject matter in the digital image is described below in conjunction with FIG. 8.

Figure 7A:
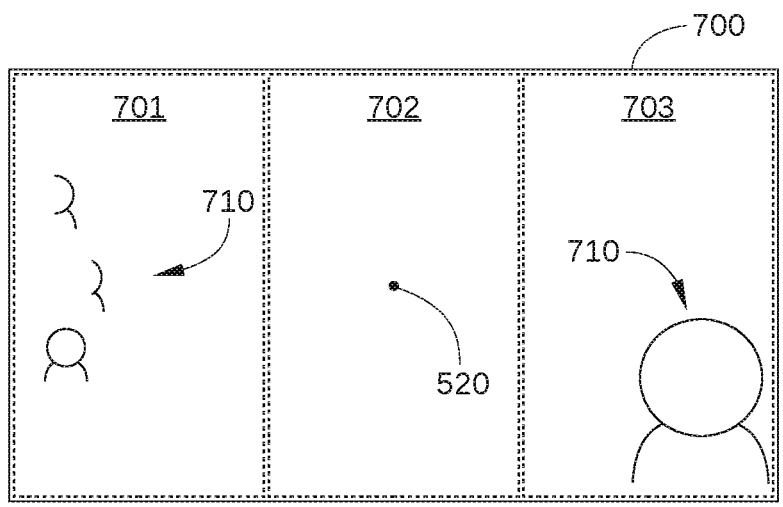
FIG. 7A illustrates an edge diagram and visual interest regions associated with a digital image, according to various embodiments of the present invention.

FIG. 7A illustrates an edge diagram 700 and visual interest regions 701-703 associated with digital image 500, according to various embodiments of the present invention. Edge diagram 700 includes edges 710 that have been detected in digital image 500 via a conventional edge detection algorithm. In one or more embodiments, edge detection is performed on digital image 500 after a blurring algorithm has been applied to digital image 500. Consequently, in such embodiments, the most prominent edges in digital image 500 are included in edge diagram 700, such as edges associated with subject matter that is more sharply focused. By contrast, less prominent edges, such as edges associated with subject matter that is not sharply focused, are not included in edge diagram 700. Edge diagram 700 also includes visual interest regions 701-703.

Each of visual interest regions 701-703 defines a specific portion of edge diagram 700 in which a visual interest score is computed based on predetermined criteria. Computation of visual interest scores is described below in conjunction with FIGS. 8A and 8B. In one or more embodiments, the shape, size, and location of visual interest regions 701-703 are selected so that all pixels of edge diagram 700 are included in at least one of visual interest regions 701-703. In other embodiments, visual interest regions 701-703 may be positioned at specific locations within edge diagram 700, for example based on the locations of detected edges 710. Therefore, in such embodiments, every pixel of edge diagram 700 may not necessarily be included in one of visual interest regions 701-703.

In the embodiment illustrated in FIG. 7A, visual interest regions 701-703 do not overlap, so that each pixel in edge diagram 700 is located in a single visual interest region 701-703. In other embodiments, some or all of the visual interest regions associated with edge diagram 700 overlap with one or more of the other visual interest regions associated with edge diagram 700. One such embodiment is illustrated in FIG. 7B.

Figure 7B:
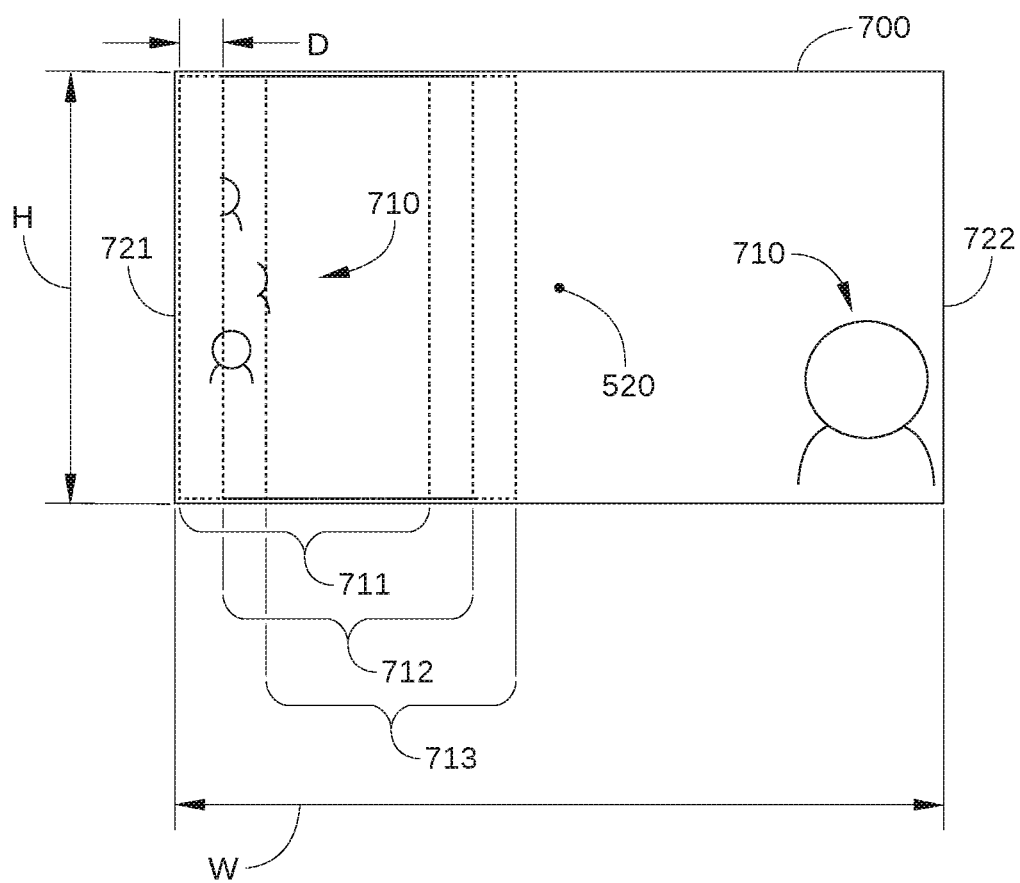
FIG. 7B illustrates an edge diagram and visual interest regions, according to various other embodiments of the present invention.

FIG. 7B illustrates edge diagram 700 and visual interest regions 711-713, according to various other embodiments of the present invention. For clarity, in FIG. 7B only three visual interest regions are depicted. In practice, a plurality of visual interest regions similar to visual interest regions 711-713 are typically associated with edge diagram 700, and are positioned to be evenly distributed across edge diagram 700 from horizontal edge 721 to horizontal edge 722. Thus, in the embodiment illustrated in FIG. 7B, the locations selected for each of visual interest regions 711-713 is independent of what detected edges are present in edge diagram 700.

As shown, each of visual interest regions 711-713 overlaps with multiple other visual interest regions. In addition, each of visual interest regions 711-713 is horizontally displaced (or alternatively, vertically displaced) in edge diagram 700 from another of visual interest regions 711-713 by a fixed horizontal (or vertical) offset distance D. Thus, visual interest region 712 is offset horizontally from visual interest region 711 in the direction of horizontal edge 722 by offset distance D, visual interest region 713 is offset horizontally from visual interest region 712 in the direction of horizontal edge 722 by offset distance D, a further visual interest region (not shown) is offset horizontally from visual interest region 713 in the direction of horizontal edge 722, and so on to horizontal edge 722, so that all or substantially all pixels in edge diagram 700 are included in at least one visual interest region associated with edge diagram 700.

Offset distance D may be any technically feasible distance, typically expressed in pixels, and may be as small as a single pixel or as large as a significant fraction of the width W of edge diagram 700, such as $\frac{1}{10}$ of width W, $\frac{1}{5}$ of width W, etc. In some embodiments, offset distance D is a fixed value for all of visual interest regions 711-713. In other embodiments, offset distance D may vary across edge diagram 700.

In the embodiment illustrated in FIG. 7B, each of visual interest regions 711-713 has a vertical dimension equal to height H of edge diagram 700. In other embodiments, visual interest regions 711-713 may have a vertical dimension that is not equal to height H. Furthermore, visual interest regions 711-713 are not necessarily rectangular, and may instead have any technically feasible shape. Moreover, any other scheme for uniformly distributing visual interest regions 711-713 across edge diagram 700 may be employed without exceeding the scope of the present invention.

Figure 7C:
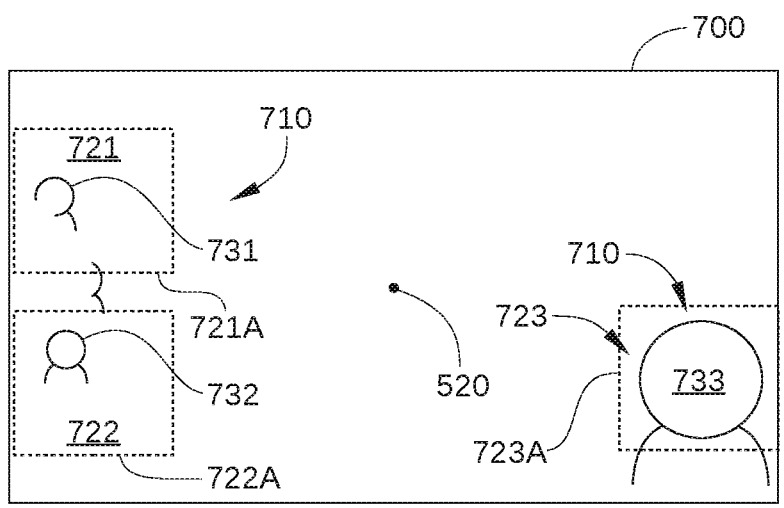
FIG. 7C illustrates edge diagram and visual interest regions, according to yet other various embodiments of the present invention.

In some embodiments, the locations selected for visual interest regions associated with edge diagram 700 are based on what detected edges are present in edge diagram 700. One such embodiment is illustrated in FIG. 7C. FIG. 7C illustrates edge diagram 700 and visual interest regions 721-723, according to various other embodiments of the present invention. In contrast to the embodiment illustrated in FIG. 7B, in FIG. 7C visual interest regions 721-723 are not necessarily positioned to be evenly distributed within edge diagram 700. Instead, the locations of visual interest regions 721-723 within edge diagram 700 are based on objects that have been detected in edge diagram 700, for example via an edge detection algorithm. In edge diagram 700, three separate objects 731, 732, and 733 that have closed, or substantially closed, boundaries have been detected, where the closed boundaries are based on the detected edges 710 generated from the subject matter of digital image 500. Consequently, one visual interest region is located in edge diagram 700 to encompass a respective one of objects 731, 732, or 733 without crossing the detected boundary thereof.

For example, in the embodiment illustrated in FIG. 7C, visual interest region 721 is located so that object 731 is included within the outer boundaries 721A of visual interest region 721, i.e., so that none of the detected boundaries of object 731 intersect with an outer boundary 721A of visual interest region 721. Alternatively, in some embodiments, visual interest region 721 may be located so that a minimal or reduced number of the detected boundaries of object 731 intersect with an outer boundary 721A of visual interest region 721. Such an embodiment is beneficial when object 731 is too large in at least one dimension to be located completely within visual interest region 721. Similarly, visual interest region 722 is located so that object 732 is included within the outer boundaries 722A of visual interest region 722, and visual interest region 723 is located so that object 733 is included within the outer boundaries 723A of visual interest region 723.

Thus, in the embodiment illustrated in FIG. 7C, a total number of visual interest regions for which a visual interest score is computed can be greatly reduced. Furthermore, the visual interest regions employed are focused on portions of edge diagram 700 that are most likely to include subject matter of higher visual interest to a viewer.

Generally, the visual interest regions associated with a particular edge diagram each have the same surface area, to facilitate an accurate comparison of the visual interest scores for each visual interest region. However, according to some embodiments, visual interest regions may have any technically feasible shape for computing visual interest scores, and are not limited to being square or rectangular. For example, in some embodiments, the above-described visual interest regions associated with edge diagram 700 may have a circular, triangular, hexagonal, or any other geometric shape.

Figure 8:
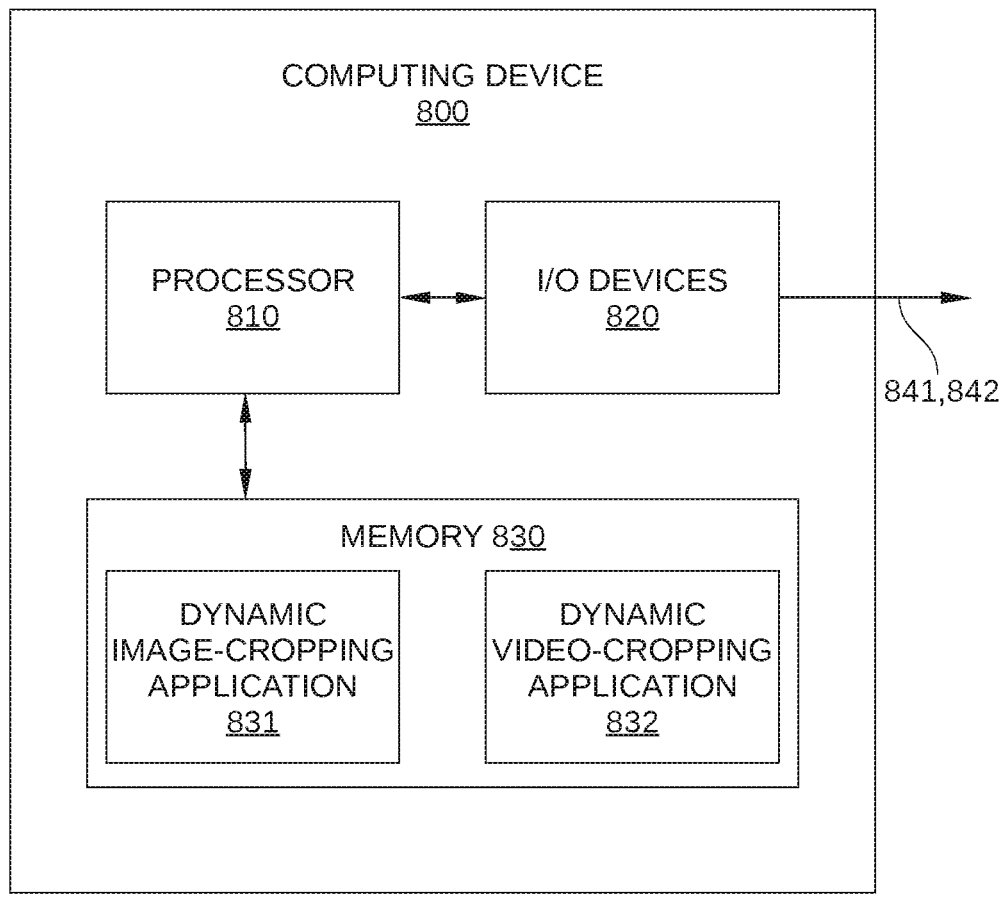
FIG. 8 is an illustration of a computing device, according to various embodiments.

FIG. 8 is an illustration of a computing device 800, according to various embodiments. Computing device 800 is configured to calculate dynamic image-cropping metadata for individual digital images by executing a dynamic image-cropping application, such as dynamic image-cropping application 831, according to one or more embodiments of the present invention. Alternatively or additionally, computing device 800 is configured to calculate dynamic video-cropping metadata for digital video content by executing a dynamic video-cropping application, such as dynamic video-cropping application 832, according to one or more embodiments of the present invention.

Computing device 800 may be any type of device capable of executing application programs including, without limitation, instructions associated with dynamic image-cropping application 831 and dynamic video-cropping application 832. Dynamic image-cropping application 831 dynamic video-cropping application 832 are described below in conjunction with FIGS. 9A, 9B, and 10. For example, and without limitation, computing device 800 may be a laptop, a tablet, a smartphone, etc. In the embodiment illustrated in FIG. 8, computing device 800 includes, without limitation, a processor 810, input/output (I/O) devices 820, and a memory 830.

Processor 810 may be implemented as a central processing unit (CPU), a graphics processing unit (GPU), an ASIC, an FPGA, any other type of processing unit, or a combination of different processing units. In general, processor 810 may be any technically feasible hardware unit capable of processing data and/or executing software applications to facilitate execution of dynamic image-cropping application 831 and/or dynamic video-cropping application 832, as described herein. Among other things, and without limitation, processor 810 may be configured to execute instructions associated with dynamic image-cropping application 831 and/or dynamic video-cropping application 832.

I/O devices 820 may include input devices, output devices, and devices capable of both receiving input (e.g., digital images and/or digital videos, etc.) and providing output (e.g., dynamic image-cropping metadata 841 and dynamic video-cropping metadata 842). Memory 830 may include a memory module or a collection of memory modules. As shown, in some embodiments, some or all of dynamic image-cropping application 831 and/or dynamic video-cropping application 832 may reside in memory 830 during operation.

Computing device 800 may be implemented as a stand-alone chip, such as a microprocessor, or as part of a more comprehensive solution that is implemented as an application-specific integrated circuit (ASIC), a system-on-a-chip (SoC), and so forth. Generally, computing device 800 may be configured to coordinate the overall operation of a computer-based system. In other embodiments, computing device 800 may be coupled to, but separate from such a computer-based system. In such embodiments, the computer-based system may include a separate processor that transmits input to computing device 800, such as digital images and/or digital videos, and receives output from computing device 800, such as dynamic image-cropping metadata 841 and dynamic video-cropping metadata 842. However, the embodiments disclosed herein contemplate any technically feasible system configured to implement dynamic image-cropping application 831 and/or dynamic video-cropping application 832, in any combination. In alternative embodiments, rather than being configured as a stand-alone machine, computing device 800 may be associated with or included in one or more of content servers 110 and/or control servers 120 in FIG. 1. For example, and without limitation, the functionality of computing device 800 may be incorporated into CPU 204 of content server 110, shown in FIG. 2. In such embodiments, dynamic image-cropping application 831 and/or dynamic video-cropping application 832 may reside in one or more of content servers 110 and/or control servers 120 during operation.

Figure 9A:
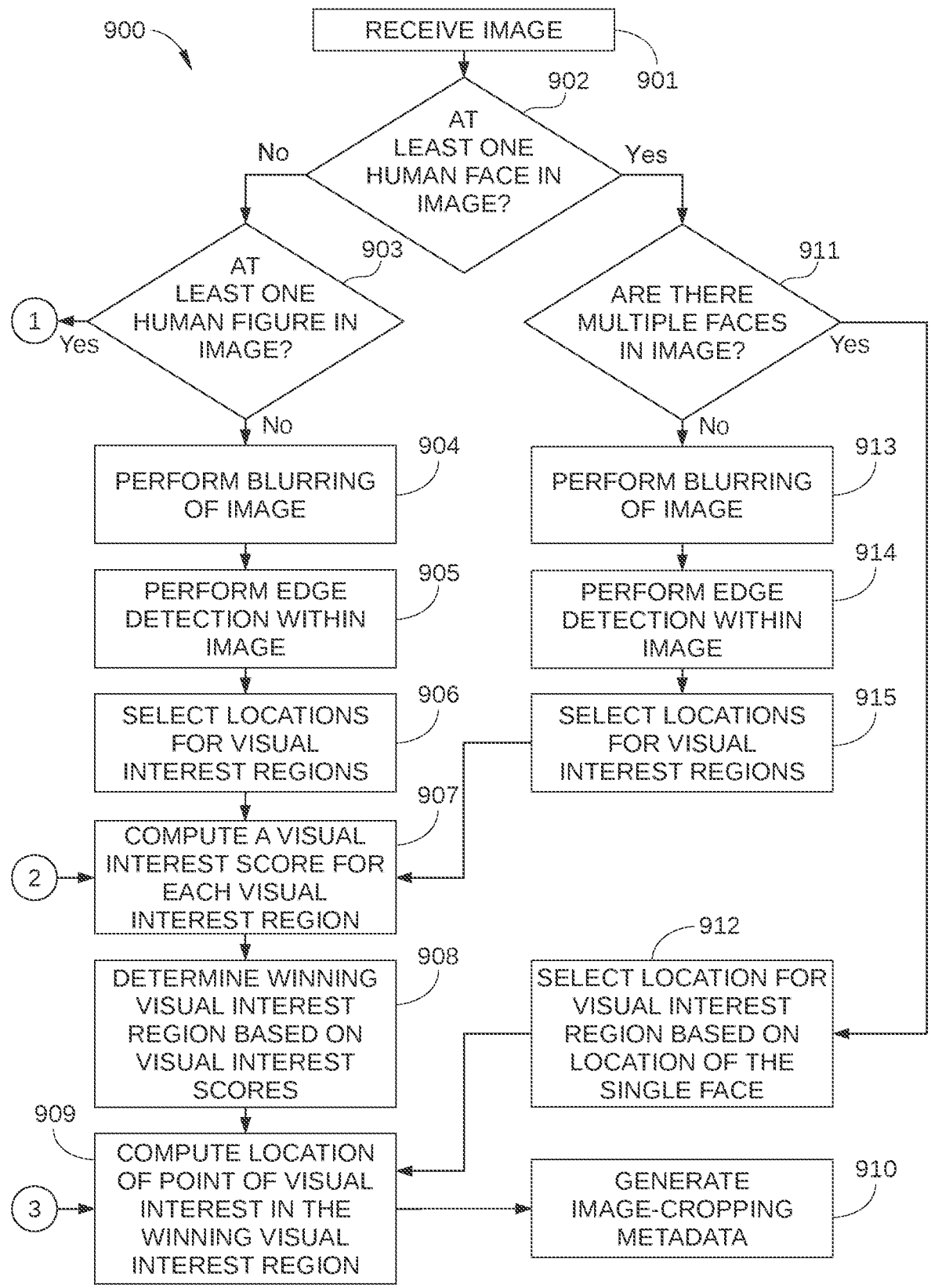
FIGS. 9A and 9B sets forth a flowchart of method steps for determining a location of a point of visual interest in a digital image, according to various embodiments of the present invention.
Figure 9B:
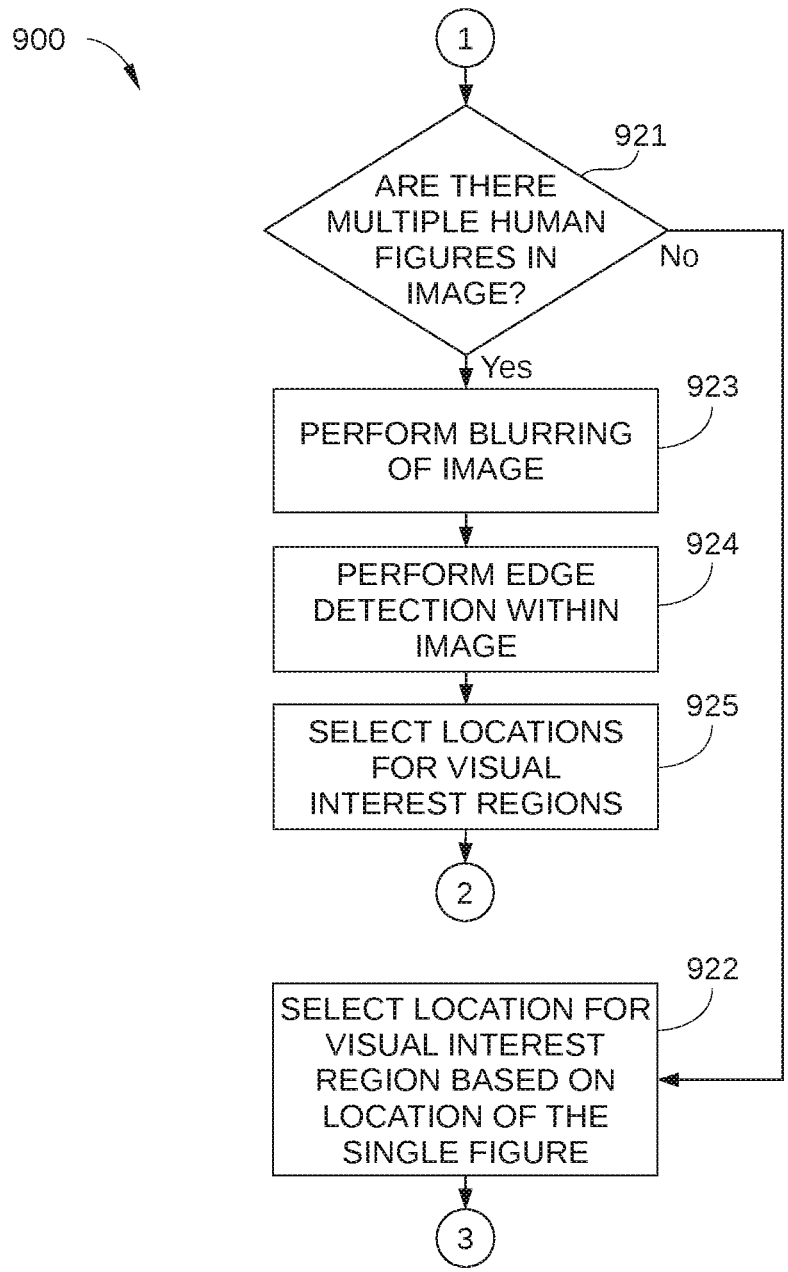

FIGS. 9A and 9B set forth a flowchart of method steps for determining a location of a point of visual interest in a digital image, according to various embodiments of the present invention. Although the method steps are described with respect to the systems of FIGS. 1-8, persons skilled in the art will understand that any system configured to perform the method steps, in any order, falls within the scope of the present disclosure.

As shown, a method 900 begins at step 901, in which dynamic image-cropping application 831 receives a digital image, such as digital image 500 in FIG. 5D. Thus, in some embodiments, the received digital image 500 is a stand-alone digital image, and in other embodiments, the received digital image 500 is a single frame from a digital video. Digital image 500 may be received from a computing device associated with content server 110, or from any other suitable computing device. For example, digital image 500 may be an advertising still image associated with a particular move or video included in files 218 stored by system disk 206 of content server 110. Alternatively, digital image be a single frame from a digital video.

In step 902, dynamic image-cropping application 831 determines whether digital image 500 includes at least one human face. Generally, a point of high visual interest and/or the point of highest visual interest in an image should correspond to a human face, if present. Thus, in step 902, dynamic image-cropping application 831 determines whether any human faces are present in digital image, before performing other steps of dynamic image-cropping application 831. If yes, method 900 proceeds to step 911; if not, method 900 proceeds to step 903. Any technically feasible face detection algorithm may be employed in step 903 to determine whether one or more human faces are visible in digital image 500.

In step 903, dynamic image-cropping application 831 determines whether digital image 500 includes at least one human form or figure. Similar to human faces, a point of high visual interest in an image often corresponds to a human form or figure, when no human face is visible. Thus, in step 903, dynamic image-cropping application 831 determines whether any human forms or figures are present in digital image 500, before performing other steps of dynamic image-cropping application 831. If yes, method 900 proceeds to step 921 in FIG. 9B; if no, method 900 proceeds to step 904 in FIG. 9A. Any technically feasible human form or human figure detection algorithm may be employed in step 903 to determine whether one or more human forms or figures are visible in digital image 500.

In step 904, which is performed in response to no human forms or faces being detected in step 903, dynamic image-cropping application 831 performs image blurring, so that edges in digital image 500 that are not well-focused are removed. Thus, in step 904, dynamic image-cropping application 831 generates a slightly blurred version of digital image 500, in which subject matter that is slightly out of focus, such as subject matter disposed in the background, has fewer or no edges. For example, in one or more embodiments, Gaussian blurring may be performed on digital image 500 in step 904. In other embodiments, any other technically feasible blurring algorithm may be employed in step 904.

In step 905, dynamic image-cropping application 831 performs edge detection on the blurred version of digital image 500 generated in step 904 to generate an edge diagram of digital image 500 similar to edge diagram 700 in FIGS. 7A-7C. Any suitable edge detection algorithm may be employed in step 905. For example, in some embodiments, Canny edge detection is employed to isolate edges in digital image 500. Because the edge detection of step 905 is performed on a blurred version of digital image 500, less visible edges and/or edges associated with less visually significant subject matter are less likely to be detected. For example, a large number of detectable edges in digital image 500 may be associated with subject matter that is in the background, and therefore is not sharply focused and generally of less visual interest to a viewer. By slightly blurring edges associated with such subject matter of digital image 500 in step 904, the visually less important portions of digital image 500 have fewer edges that can be detected in step 905. Thus, the edge detection performed in step 905 typically detects edges associated with visual subject matter that is of higher visual interest to a viewer and typically fails to detect edges associated with subject matter that is of lower visual interest to a viewer.

In step 906, dynamic image-cropping application 831 employs the edge diagram of digital image 500 generated in step 905 to select the location of multiple visual interest regions for digital image 500. These visual interest regions facilitate a quantitative comparison of how visually interesting different locations within digital image 500 are relative to each other. That is, for each such visual interest region, a visual interest score can be computed based on predetermined criteria, as described below in step 907.

As noted above in conjunction with FIGS. 7A-7C, visual interest regions may be located within an edge diagram based on what edges and/or objects have been detected in the edge diagram associated with digital image 500. For example, in one or more embodiments, a boundary detection algorithm may be employed in step 906 to detect objects with closed or substantially closed boundaries, using the edges that have been detected in digital image 500 in step 905. In such embodiments, a different visual interest region may be located in the edge diagram to encompass or substantially encompass each such object. Alternatively, visual interest regions may be located in step 906 independent of whatever edges and/or objects have been detected in the edge diagram of digital image 500.

In step 907, dynamic image-cropping application 831 computes a visual interest score for each visual interest region associated with the edge diagram. It is noted that, depending on the subject matter included in digital image 500, the visual interest regions associated with the edge diagram may be located based on execution of step 906, step 915, or step 925 (which is shown in FIG. 9B). Depending on how the visual interest regions have been located, a different computation may be performed for determining the visual interest scores of the respective visual interest regions.

When the visual interest regions are located via execution of step 906, the subject matter of digital image is assumed to include no detectable human faces, forms, or figures. Thus, the criteria for determining a visual interest score for a visual interest region may include, without limitation: a total number of edges included in the visual interest region; an apparent size of an object included in the visual interest region; a number of detected boundaries crossed by an outer boundary of the visual interest region; and the like. In one or more embodiments, each such criterion may be weighted differently, so that each criterion does not necessarily have an equal contribution to the visual interest score.

When the visual interest regions are located via execution of step 915, the subject matter of digital image is assumed to include multiple detected human faces, and a visual interest region is associated with each detected face. Thus, the criteria for determining a visual interest score for a visual interest region may include, without limitation: an apparent size of the detected face associated with the visual interest region; a number of detected boundaries of the face crossed by an outer boundary of the visual interest region; whether the face is oriented toward the camera; whether the face is associated with or included as an element of a standing human figure; a number of detected edges included in the face; and the like. In one or more embodiments, each such criterion may be weighted differently, so that each criterion does not necessarily have an equal contribution to the visual interest score.

When the visual interest regions are located via execution of step 925, the subject matter of digital image is assumed to include multiple detected human forms or figures, and a visual interest region may be associated with each detected form or figure. Thus, the criteria for determining a visual interest score for a visual interest region may include, without limitation: an apparent size of the detected form or figure associated with the visual interest region; a number of detected boundaries of the form or figure crossed by an outer boundary of the visual interest region; whether the form or figure is oriented toward the camera; whether the form or figure is a standing figure; a number of detected edges included in the form or figure; and the like. In one or more embodiments, each such criterion may be weighted differently, so that each criterion does not necessarily have an equal contribution to the visual interest score.

In step 908, dynamic image-cropping application 831 determines a winning visual interest region associated with the edge diagram, based on the visual interest scores computed in step 907.

In step 909, dynamic image-cropping application 831 determines a location within the edge diagram (and therefore within digital image 500) of the point of high or highest visual interest. The location of the point of high or highest visual interest is generally based on the winning visual interest region. In some embodiments, the determined location corresponds to a centroid or geometric center of the winning visual interest region, i.e., the arithmetic mean or average position of all the points in the shape. Thus, in such embodiments, when the winning visual interest region is square, rectangular, circular, or hexagonal in shape, the location of the point of high or highest visual interest may be a center point of the winning visual interest region. In other embodiments, the determined location may correspond to some other point within the winning visual interest region.

In step 910, dynamic image-cropping application 831 generates dynamic image-cropping metadata for digital image 500, where the metadata is stored in any suitable location, such as in files 218 in one or more content servers 110 in FIG. 1. In some embodiments, such metadata for digital image 500 may include a normalized horizontal position value and a normalized vertical position value, that together indicate a normalized location of a point of visual interest within digital image 500. That is, the horizontal length of digital image 500 is assumed to be 1.0, the vertical length of digital image 500 is assumed to be 1.0, and dynamic image-cropping application 831 includes a value between 0.0 and 1.0 for the vertical and for the horizontal position of the point of visual interest within digital image 500. In such embodiments, such a normalized value for the vertical position can be multiplied by the pixel height 502 of digital image 500 to determine the vertical pixel location of the point of visual interest. Similarly, such a normalized value for the horizontal position can be multiplied by the pixel width 501 of digital image 500 to determine the horizontal pixel location of the point of visual interest. Therefore, the display engine in endpoint device 115 that generates images for display can easily compute what portion of digital image 500 to display, regardless of what the current resolution of display device 450 is or what the resolution of digital image 500 as received by endpoint device 115 is. For example, when the point of high or highest visual interest of digital image 500 is proximate center point 520 of digital image 500, the dynamic image-cropping metadata for digital image 500 includes a normalized horizontal position value of 0.5 and a normalized vertical position value of 0.5. Alternatively, the dynamic image-cropping metadata for digital image 500 generated in step 910 may include any other technically feasible measure of position within digital image 500.

In step 911, which is performed in response to at least one human face being detected in step 902, dynamic image-cropping application 831 determines whether digital image 500 includes multiple human faces. If no, method 900 proceeds to step 912; if yes, method 900 proceeds to step 913.

In step 912, dynamic image-cropping application 831 selects the location of a single visual interest region for digital image 500, based on the single human face detected in step 911. For example, the single visual interest region may be located so that the single human face is centered therein. Method 900 then proceeds to step 909. Because a single human face in an image is typically assumed to be a point of high or highest visual interest to a viewer, a winning visual interest region does not need to be determined in this case.

In step 913, dynamic image-cropping application 831 performs image blurring, so that edges in digital image 500 that are not well-focused are removed. Step 913 may be substantially similar to step 904, described above.

In step 914, dynamic image-cropping application 831 performs edge detection on the blurred version of digital image 500 generated in step 913 to generate an edge diagram of digital image 500 similar to edge diagram 700 in FIG. 7. Step 914 may be substantially similar to step 905, described above.

In step 915, dynamic image-cropping application 831 employs the edge diagram of digital image 500 generated in step 914 to select the location of multiple visual interest regions for digital image 500. These visual interest regions may be located within an edge diagram based on what human faces have been detected in the edge diagram associated with digital image 500. Otherwise, step 915 may be substantially similar to step 906, described above. Method 900 then proceeds to step 907.

Turning to FIG. 9B, in step 921, which is performed in response to at least one human form or figure being detected in step 903, dynamic image-cropping application 831 determines whether digital image 500 includes multiple human forms or figures. If no, method 900 proceeds to step 922; if yes, method 900 proceeds to step 923.

In step 922, dynamic image-cropping application 831 selects the location of a single visual interest region for digital image 500, based on the single human form or figure detected in step 921. For example, the single visual interest region may be located so that the single human form or figure is centered therein. Method 900 then proceeds to step 909. Because a single human form or figure in an image is typically assumed to be a point of high or highest visual interest to a viewer, a winning visual interest region does not need to be determined in this case.

In step 923, dynamic image-cropping application 831 performs image blurring, so that edges in digital image 500 that are not well-focused are removed. Step 923 may be substantially similar to step 904, described above.

In step 924, dynamic image-cropping application 831 performs edge detection on the blurred version of digital image 500 generated in step 923 to generate an edge diagram of digital image 500 similar to edge diagram 700 in FIG. 7. Step 924 may be substantially similar to step 905, described above.

In step 925, dynamic image-cropping application 831 employs the edge diagram of digital image 500 generated in step 924 to select the location of multiple visual interest regions for digital image 500. These visual interest regions may be located within an edge diagram based on what human figures have been detected in the edge diagram associated with digital image 500. Otherwise, step 925 may be substantially similar to step 906, described above. Method 900 then proceeds to step 907.

Implementation of method 900 enables the generation of metadata for a digital image, such as dynamic image-cropping metadata 841. In some embodiments, an endpoint device 115 can receive the digital image and dynamic image-cropping metadata 841 associated with the digital image. In such embodiments, the display engine of endpoint device 115 can display the digital image so that a point of high or highest visual interest of the digital image is viewable, even when the display aspect ratio of the digital image is significantly different than the display aspect ratio of the display device of endpoint device 115. Thus, the digital image is "dynamically cropped" by the the display engine of endpoint device 115. It is noted that the digital image is figuratively cropped and not literally cropped. That is, portions outside the viewable region of the digital image are not removed or deleted; these portions are simply not displayed.

As with individual images, when a video having one display aspect ratio is displayed by an endpoint device 115 with a significantly different display aspect ratio, a point of high or highest visual interest of the digital video may not be viewable. Conventionally, the portion of each video frame that is displayed is selected independent of the subject matter included in the video frame. For example, the portion of each video frame that is displayed by the endpoint device may correspond to the portion centered about a center point of the video frame. According to one or more embodiments of the invention, based on metadata associated with a digital video, the digital video can be dynamically cropped when displayed by an endpoint device 115. As a result, a point of high or highest visual interest of the digital video is viewable when displayed, even when the display aspect ratio of the digital image is significantly different than the display aspect ratio of the endpoint device 115.

In such embodiments, a dynamic video-cropping application may be configured to calculate dynamic video-cropping metadata 842 for digital video content, such as with dynamic video-cropping application 832. For example, dynamic video-cropping application 832 enables determination of a single point of high or highest visual interest for a plurality of frames, for example for all video frames in a particular video segment, rather than for each individual video frame in the video segment. Therefore, the video frames of the particular video segment are all dynamically cropped in the same way. Consequently, the displayed portion each video frame does not jump around as the video segment is played and the location of the point of high or highest visual interest for each frame changes. Instead, the displayed portion of each video frame remains centered on the single point of high or highest visual interest for the video segment. One such embodiment is illustrated in FIG. 10.

Figure 10:
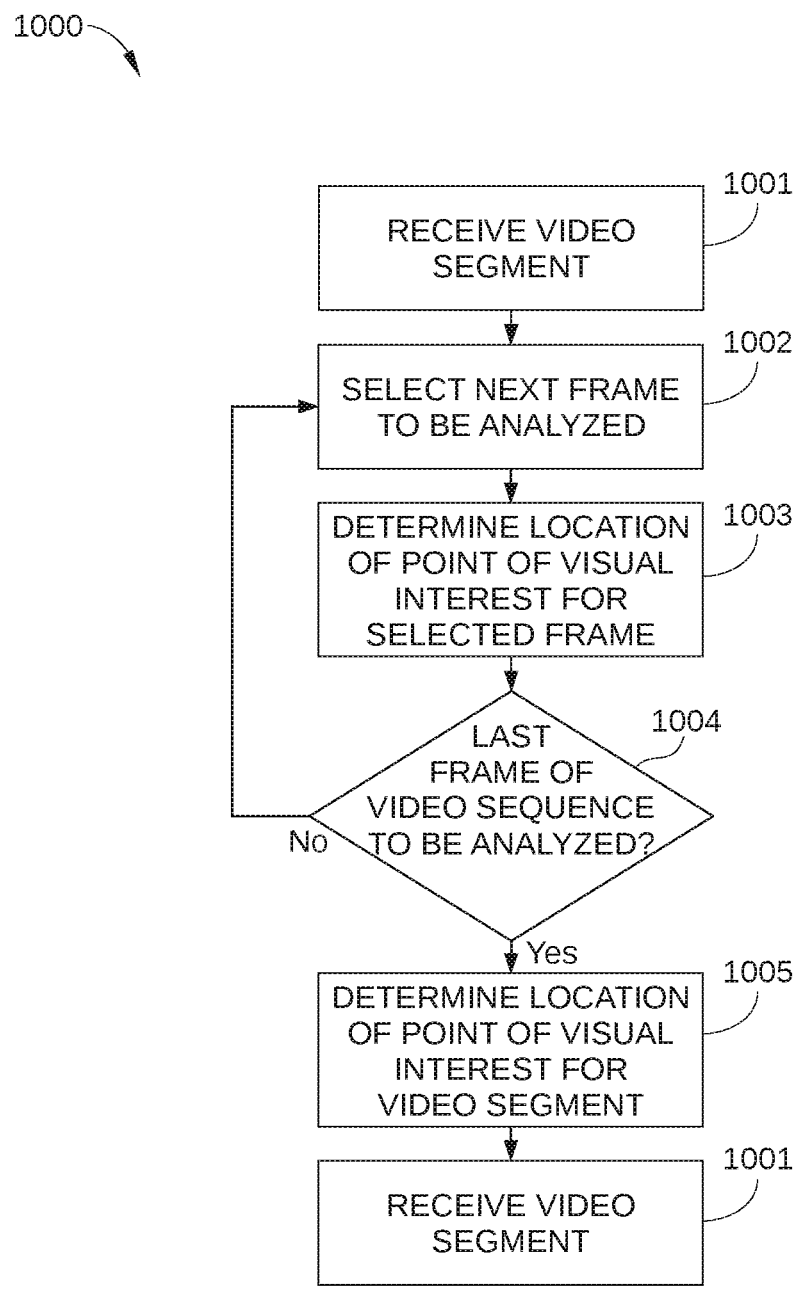
FIG. 10 sets forth a flowchart of method steps for determining a location of a point of visual interest in a digital video, according to various embodiments of the present invention.

FIG. 10 sets forth a flowchart of method steps for determining a location of a point of visual interest in a digital video, according to various embodiments of the present invention. Although the method steps are described with respect to the systems of FIGS. 1-9, persons skilled in the art will understand that any system configured to perform the method steps, in any order, falls within the scope of the present disclosure.

As shown, a method 1000 begins at step 1001, in which dynamic video-cropping application 832 receives a video segment that includes a sequential group of video frames of a digital video content item. For example, the video segment may be a single shot or view included in a larger digital video content item. That is, the single shot or view typically includes a visually uninterrupted series of frames between two cuts or edits of the larger digital video content item. In the single shot or view, the point of view of the viewer remains stationary or substantially the stationary. Thus, a shot can be considered the smallest unit of visual continuity of the larger digital video content item. By contrast, a dramatic scene typically includes a plurality of shots. For example, in filmmaking, a dramatic scene in which dialogue between multiple actors takes place may include either a single shot or a plurality of shots; when a different shot is employed each time a different actor speaks, the dramatic scene is visually broken up, while each different shot included in the scene is not.

In step 1002, dynamic video-cropping application 832 selects a video frame to be analyzed from the video segment received in step 1001.

In step 1003, dynamic video-cropping application 832 determines a location of a point of high or of highest visual interest for the selected frame. In some embodiments, the method 900 of FIGS. 9A and 9B is employed to determine this location.

In step 1004, dynamic video-cropping application 832 determines whether the video frame analyzed in step 1003 is the last remaining video frame to be analyzed from the video segment received in step 1001. If no, method 1000 proceeds back to step 1002; if yes, method 1000 proceeds to step 1005.

In step 1005, dynamic video-cropping application 832 determines a location of a point of high or of highest visual interest for the video segment received in step 1001. Generally, the location of the point of high or of highest visual interest for the video segment is determined based on each of the locations of the point of high or of highest visual interest for each frame of the video segment. In some embodiments, the location of the point of high or of highest visual interest for the video segment is determined by computing an average location of the point of high or of highest visual interest for each frame of the video segment. In other embodiments, the location of the point of high or of highest visual interest for the video segment is determined based on any other mathematical combination of the point of high or of highest visual interest for each frame of the video segment, such as a median location or a weighted average location of the point of high or of highest visual interest for each frame of the video segment.

In step 1006, dynamic video-cropping application 832 generates dynamic video-cropping metadata 842. Dynamic video-cropping metadata 842 can then be stored and subsequently transmitted with the video segment, to enable an endpoint device 115 to dynamically crop the video segment so that the point of high or of highest visual interest for the video segment is viewable.

Implementation of method 1000 enables the generation of metadata for a digital video segment, such as dynamic video-cropping metadata 842. In some embodiments, an endpoint device 115 can receive the digital video segment and dynamic video-cropping metadata 842 associated with the digital video segment. In such embodiments, the endpoint device 115 can display the digital video segment so that a point of high or highest visual interest of the digital video segment is viewable, even when the display aspect ratio of the digital video is significantly different than the display aspect ratio of the endpoint device 115. Thus, the digital video segment is "dynamically cropped" by the endpoint device 115. Furthermore, it is noted that a point of high or highest visual interest is determined for an entire shot, so that the frames of the shot are all dynamically cropped in the same way. That is, the displayed portion of each video frame remains centered on the single point of high or highest visual interest for the video segment.

Dynamically Cropping Digital Content

Figure 11:
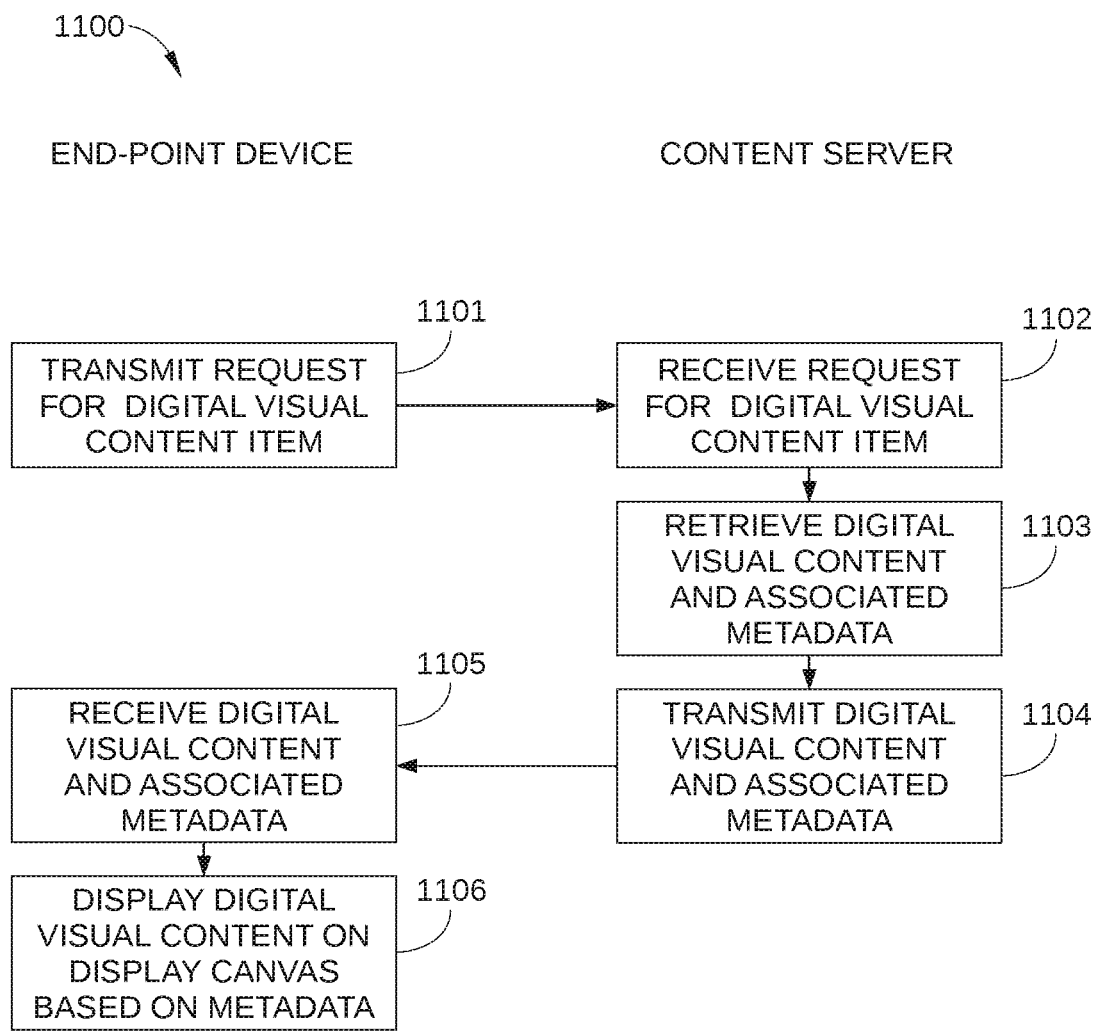
FIG. 11 sets forth a flowchart of method steps for dynamically cropping image data transmitted to an endpoint device, according to various embodiments of the present invention.

FIG. 11 sets forth a flowchart of method steps for dynamically cropping image data transmitted to an endpoint device, according to various embodiments of the present invention. Although the method steps are described with respect to the systems of FIGS. 1-10, persons skilled in the art will understand that any system configured to perform the method steps, in any order, falls within the scope of the present disclosure.

As shown, a method 1100 begins at step 1101, in which an endpoint device 115 transmits a request for a digital visual content item, such as a digital video or a digital image. In some embodiments, the request in step 1101 may be initiated by a website for a strip advertisement or for content associated with a strip advertisement. In other embodiments, the request in step 1101 may be initiated by playback application 436 to provide digital visual content to a user.

In step 1002, a content server 110 receives the request transmitted in step 1101.

In step 1003, the content server 110 retrieves digital content and associated metadata, for example from files 218 stored on system disk 206. When the digital visual content item includes a digital image, the metadata includes dynamic image-cropping metadata 841 associated with the digital image. When the digital visual content item includes digital video content, the metadata includes dynamic video-cropping metadata 842 associated with the digital video content.

In step 1004, the content server 110 transmits the digital content and associated metadata retrieved in step 1003.

In step 1005, the endpoint device 115 receives the requested digital content and associated metadata.

In step 1006, the endpoint device 115 displays the requested digital content based on the metadata associated with the requested digital content. In particular, the endpoint device 115 displays the digital content based on a location of the point of high or of highest visual interest for the digital content. Thus, the portion of the digital content that is displayed on a display screen of the endpoint device 115 includes the location of the point of visual interest indicated in the metadata. In some embodiments, the portion of the digital content that is displayed on the display screen of the endpoint device 115 is centered on the point of visual interest indicated in the metadata. In other embodiments, the portion of the digital content that is displayed on the display screen of the endpoint device 115 includes the location of the point of visual interest, but that location is not necessarily centered in the displayed portion of the digital content. As noted above, when the requested digital content includes a video segment, all frames of the video segment are generally displayed centered on the same point of visual interest in the metadata. When the metadata include a normalized horizontal position value and a normalized vertical position value, the display engine of the endpoint device 115 can calculate the location of the point of visual interest by multiplying a pixel height of a display device associated with the endpoint device 115 by the normalized vertical position value and by multiplying a pixel width of the display device by the normalized horizontal position value.

In sum, a digital visual content item, such as a digital image or a digital video, is transmitted to an endpoint device, together with dynamic cropping metadata associated with the digital visual content item. The dynamic cropping metadata for a particular digital visual content item is generated based on subject matter included in the digital visual content item. The dynamic cropping metadata enables an endpoint device to dynamically crop that particular digital visual content item so that the most visually interesting or significant subject matter in the digital visual content item is displayed.

At least one advantage of the disclosed techniques is that, even when the display aspect ratio of a digital visual content item varies significantly from the display aspect ratio of a display device, the most visually interesting or significant subject matter in the digital visual content item remains viewable.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A non-transitory computer-readable storage medium including instructions that, when executed by a processor, cause the processor to perform the steps of:
    performing one or more operations on a digital image to detect faces within the digital image;
    in response to detecting that the digital image includes no faces, a first set of additional operations on the digital image to detect figures within the digital image;
    in response to detecting that the digital image includes no figures, performing a second set of additional operations on the digital image to detect edges within the digital image;
    dividing the digital image into a plurality of visual interest regions within the digital image;
    computing a first visual interest score for a first visual interest region in the plurality of visual interest regions based on either one or more faces detected within the first visual interest region and a first set of criteria, one or more figures detected within the first visual interest region and a second set of criteria when the digital image includes no faces, or one or more edges detected within the first visual interest region and a third set of criteria when the digital image includes no faces or figures;
    computing a second visual interest score for a second visual interest region in the plurality of visual interest regions based on either one or more faces detected within the second visual interest region and the first set of criteria, one or more figures detected within the second visual interest region and the second set of criteria when the digital image includes no faces, or one or more edges detected within the second visual interest region and the third set of criteria when the digital image includes no faces or figures;
    determining that the first visual interest region is preferred over the second visual interest region based on the first visual interest score and the second visual interest score;
    setting a location within the first visual interest region as a point of visual interest and
    transmitting the digital image and the location of the point of visual interest to a computing device, wherein the computing device determines, based on the location of the point of visual interest and a display aspect ratio of a display device associated with the computing device, a cropping of the digital image to a portion of the digital image that includes the point of visual interest.

2. The non-transitory computer-readable storage medium of claim 1, wherein the location of the point of visual interest coincides with a centroid of the portion of the image.

3. The non-transitory computer-readable storage medium of claim 1, wherein at least one face is detected, and the steps further comprise:
    selecting a location in the digital image for the first visual interest region based on a location of the at least one face.

4. The non-transitory computer-readable storage medium of claim 3, wherein the location in the digital image for the first visual interest region is coincident with a centroid of the at least one face.

5. The non-transitory computer-readable storage medium of claim 1, wherein multiple faces are detected, and the steps further comprise:
    selecting a location in the digital image for the first visual interest region based on a location of one face included in the multiple faces; and
    selecting a location in the digital image for the second visual interest region based on a location of another face included in the multiple faces.

6. The non-transitory computer-readable storage medium of claim 1, the steps further comprising:
    detecting one or more objects included in the digital image based on edges therein.

7. The non-transitory computer-readable storage medium of claim 6, the steps further comprising selecting a location in the digital image for the first visual interest region based on a location of at least one object included in the digital image.

8. The non-transitory computer-readable storage medium of claim 6, the steps further comprising selecting a location in the digital image for the first visual interest region based on a location of one of the one or more objects included in the digital image, and selecting a location in the digital image for the second visual interest region based on a location of another of the one or more objects included in the digital image.

9. The non-transitory computer-readable storage medium of claim 1, wherein the location of the point of visual interest within the first visual interest region is coincident with a centroid of the first visual interest region.

10. The non-transitory computer-readable storage medium of claim 1, wherein each visual interest region included in the plurality of visual interest regions has a vertical dimension equal to a height of the digital image.

11. The non-transitory computer-readable storage medium of claim 1, wherein the one or more additional operations to detect edges within the digital image include applying a blurring algorithm to the digital image prior to performing one or more edge detection operations.

12. A computer-implemented method, comprising:
performing one or more operations on a digital image to detect faces within the digital image;
in response to detecting that the digital image includes no faces, a first set of additional operations on the digital image to detect figures within the digital image;
in response to detecting that the digital image includes no figures, performing a second set of additional operations on the digital image to detect edges within the digital image;
dividing the digital image into a plurality of visual interest regions within the digital image;
computing a first visual interest score for a first visual interest region in the plurality of visual interest regions based on either one or more faces detected within the first visual interest region and a first set of criteria, one or more figures detected within the first visual interest region and a second set of criteria when the digital image includes no faces, or one or more edges detected within the first visual interest region and a third set of criteria when the digital image includes no faces or figures;
computing a second visual interest score for a second visual interest region in the plurality of visual interest regions based on either one or more faces detected within the second visual interest region and the first set of criteria, one or more figures detected within the second visual interest region and the second set of criteria when the digital image includes no faces, or one or more edges detected within the second visual interest region and the third set of criteria when the digital image includes no faces or figures;
determining that the first visual interest region is preferred over the second visual interest region based on the first visual interest score and the second visual interest score;
setting a location within the first visual interest region as a point of visual interest; and
transmitting the digital image and the location of the point of visual interest to a computing device, wherein the computing device determines, based on the location of the point of visual interest and a display aspect ratio of a display device associated with the computing device, a cropping of the digital image to a portion of the digital image that includes the point of visual interest.

13. The method of claim 12, wherein the location of the point of visual interest within the first visual interest region is defined by a normalized vertical position value and a normalized horizontal position value.

14. The method of claim 13, wherein the computing device is configured to cause the portion of the image to be displayed on a display device by multiplying the normalized vertical position value by a pixel height of the digital image and by multiplying the normalized horizontal position value by a pixel width of the digital image.

15. The method of claim 12, wherein at least one face is detected, and the method further comprises:
selecting a location in the digital image for the first visual interest region based on a location of a face included in the at least one face.

16. The method of claim 12, wherein the digital image comprises a single frame of a video segment that includes a plurality of video frames, and the location of the point of visual interest transmitted to the computing device is based on a location of a point of visual interest for each of the plurality of video frames.

17. The method of claim 16, wherein the location of the point of visual interest transmitted to the computing device is based on an average of the location of the point of visual interest for each of the plurality of video frames.

18. The method of claim 12, wherein multiple figures are detected, and the method further comprises:
selecting a location in the digital image for the first visual interest region based on a location of one figure included in the multiple figures; and
selecting a location in the digital image for the second visual interest region based on a location of another figure included in the multiple figures.

19. The method of claim 12, wherein the computing device is configured to cause the portion of the image to be displayed on a display device so that the location of the point of visual interest is proximate a center point of the display device.

20. A system, comprising:
a memory storing an application; and
a processor that is coupled to the memory and, when executing the application, is configured to:
perform one or more operations on a digital image to detect faces within the digital image,
in response to detecting that the digital image includes no faces, perform a first set of additional operations on the digital image to detect figures within the digital image,
in response to detecting that the digital image includes no figures, perform a second set of additional operations on the digital image to detect edges within the digital image,
divide the digital image into a plurality of visual interest regions within the digital image,
compute a first visual interest score for a first visual interest region in the plurality of visual interest regions based on either one or more faces detected within the first visual interest region and a first set of criteria, one or more figures detected within the first visual interest region and a second set of criteria when the digital image includes no faces, or one or more edges detected within the first visual interest region and a third set of criteria when the digital image includes no faces or figures,
compute a second visual interest score for a second visual interest region in the plurality of visual interest regions based on either one or more faces detected within the second visual interest region and the first set of criteria, one or more figures detected within the second visual interest region and the second set of criteria when the digital image includes no faces, or one or more edges detected within the second visual interest region and the third set of criteria when the digital image includes no faces or figures, determine that the first visual interest region is preferred over the second visual interest region based on the first visual interest score and the second visual interest score, set a location within the first visual interest region as a point of visual interest, and transmit the digital image and the location of the point of visual interest to a computing device, wherein the computing device determines, based on the location of the point of visual interest and a display aspect ratio of a display device associated with the computing device, a cropping of the digital image to a portion of the digital image that includes the point of visual interest.

21. The system of claim 20, wherein, the processor is further configured to detect one or more objects included in the digital image based on edges therein.

\* \* \* \* \*